United States Patent
Saneyoshi

(10) Patent No.: US 11,358,086 B2
(45) Date of Patent: Jun. 14, 2022

(54) STATE ESTIMATION APPARATUS, METHOD, AND PROGRAM STORAGE MEDIUM

(71) Applicant: NEC Corporation, Tokyo (JP)

(72) Inventor: Eisuke Saneyoshi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/041,825

(22) PCT Filed: Mar. 30, 2018

(86) PCT No.: PCT/JP2018/013612
§ 371 (c)(1),
(2) Date: Sep. 25, 2020

(87) PCT Pub. No.: WO2019/187003
PCT Pub. Date: Oct. 3, 2019

(65) Prior Publication Data
US 2021/0008484 A1 Jan. 14, 2021

(51) Int. Cl.
*F25D 29/00* (2006.01)
*G05B 1/01* (2006.01)
(Continued)

(52) U.S. Cl.
CPC ......... *B01D 46/0086* (2013.01); *F25D 29/00* (2013.01); *F25B 49/005* (2013.01);
(Continued)

(58) Field of Classification Search
CPC ................ B01D 46/0086; F25D 29/00; F25D 2317/041; F25D 23/0003;
(Continued)

(56) References Cited

U.S. PATENT DOCUMENTS

| 9,644,856 B1 | 5/2017 | Francis et al. |
| 2003/0024683 A1 | 2/2003 | Nagai et al. |

(Continued)

FOREIGN PATENT DOCUMENTS

| CN | 1781006 B | * | 6/2010 | ............ F25B 49/005 |
| CN | 102854379 B | * | 4/2017 | |

(Continued)

OTHER PUBLICATIONS

International Search Report for PCT Application No. PCT/JP2018/013612, dated Jun. 12, 2018.

*Primary Examiner* — Daniel R Miller
*Assistant Examiner* — Christian T Bryant
(74) *Attorney, Agent, or Firm* — Sughrue Mion, PLLC

(57) ABSTRACT

A state estimation apparatus includes: a current information acquisition part that acquires information about a current at a power supply part of a refrigerating/freezing apparatus; a current information storage part that holds current information in a normal state of the refrigerating/freezing apparatus; an evaluation part that derives a degree of change based on the acquired current information and the current information in the normal state of the refrigerating/freezing apparatus; a filter cleaning determination part that estimates a clogging state of a filter of the refrigerating/freezing apparatus based on the degree of change to determine whether cleaning of the filter is necessary; and an output part that provides, for a determination result indicating that the cleaning of the filter is necessary, an output to that effect.

6 Claims, 12 Drawing Sheets

(51) Int. Cl.
*G05B 17/00* (2006.01)
*G05B 6/02* (2006.01)
*G05B 21/00* (2006.01)
*G05B 23/02* (2006.01)
*G05B 9/02* (2006.01)
*B01D 46/00* (2022.01)
*F25B 49/00* (2006.01)
*F25D 23/00* (2006.01)

(52) U.S. Cl.
CPC ...... *F25D 23/003* (2013.01); *F25D 2317/041* (2013.01); *F25D 2323/0024* (2013.01); *F25D 2400/22* (2013.01); *G05B 1/01* (2013.01); *G05B 6/02* (2013.01); *G05B 9/02* (2013.01); *G05B 17/00* (2013.01); *G05B 21/00* (2013.01); *G05B 23/02* (2013.01)

(58) Field of Classification Search
CPC ......... F25D 2323/0024; F25D 2400/22; F25B 49/005; G05B 6/02; G05B 9/02; G05B 1/01; G05B 21/00; G05B 17/00; G05B 23/02
See application file for complete search history.

(56) References Cited

U.S. PATENT DOCUMENTS

| | | |
|---|---|---|
| 2003/0217560 A1 | 11/2003 | Kasuya et al. |
| 2011/0295524 A1 | 12/2011 | Tada et al. |
| 2015/0330650 A1* | 11/2015 | Abiprojo ................ F24F 11/62 700/276 |
| 2015/0330861 A1 | 11/2015 | Alsaleem |
| 2017/0146261 A1* | 5/2017 | Rogers ............... G05D 23/1917 |

FOREIGN PATENT DOCUMENTS

| | | | | |
|---|---|---|---|---|
| CN | 107003019 A | * | 8/2017 | ............. F24F 11/00 |
| JP | H04-203731 A | | 7/1992 | |
| JP | H05-332590 A | | 12/1993 | |
| JP | H07-262766 A | | 10/1995 | |
| JP | H08-257332 A | | 10/1996 | |
| JP | 2002-369105 A | | 12/2002 | |
| JP | 2003-207188 A | | 7/2003 | |
| JP | 2003207188 A | * | 7/2003 | ............ F25B 49/005 |
| JP | 2004-045018 A | | 2/2004 | |
| JP | 2005-106323 A | | 4/2005 | |
| JP | 2006-218158 A | | 8/2006 | |
| JP | 2006-288513 A | | 10/2006 | |
| JP | 2008-151452 A | | 7/2008 | |
| JP | 2008-262033 A | | 10/2008 | |
| JP | 2011-249522 A | | 12/2011 | |
| JP | 2014-066446 A | | 4/2014 | |
| JP | 2016065660 A | * | 4/2016 | ............. F24F 11/00 |
| JP | 2016-223711 A | | 12/2016 | |
| JP | 2017-017776 A | | 1/2017 | |
| KR | 10-2010-0012077 A | | 2/2010 | |

* cited by examiner

STATE ESTIMATION APPARATUS, METHOD, AND PROGRAM STORAGE MEDIUM

This application is a National Stage Entry of PCT/JP2018/013612 filed on Mar. 30, 2018, the contents of all of which are incorporated herein by reference, in their entirety.

FIELD

The present invention relates to a state estimation apparatus, a method, and a program storage medium.

BACKGROUND

In stores such as convenience stores and supermarkets, many refrigerating/freezing apparatuses (e.g., freezer showcases) for displaying refrigerated/frozen foods are installed.

For example, Patent Literatures (PTLs) 1 and 2 each discuss an example of a freezer showcase. FIG. 1 is a diagram illustrating a configuration example of a flat-type open showcase.

In FIG. 1, cold air is supplied from a supply opening 213 at one end of an air duct 212 to a display room (an open showcase) 215, and air (high temperature) is suctioned into a suction opening 214 at the other end of the air duct 212. Next, an evaporator 204 performs heat exchange on the air (high temperature), and a fan 211 blows the obtained low-temperature air out of the supply opening 213. As a result of the heat exchange by the evaporator 204, a refrigerant (liquid) is vaporized and low-pressure gas is supplied to a compressor 201. This low-pressure gas is compressed by the compressor 201 to be converted into high-temperature and high-pressure gas. The high-temperature and high-pressure gas is supplied to a condenser 202, at which the high-temperature and high-pressure is heat exchanged with low-temperature water. Consequently, the gas is converted into high-pressure liquid, which is expanded by an expander 203. As a result, the high-pressure liquid is converted into low-pressure liquid. This low-pressure liquid is supplied from the expander 203 to the evaporator 204. That is, the compressor 201, the condenser 202, the expander 203, and the evaporator 204 constitute a freezing cycle.

When the evaporator 204 performs a defrosting operation, a bypass valve 205 is opened, and the high-temperature and high-pressure gas is supplied from the compressor 201 to the evaporator 204. In a case where a heater system is adopted, when the evaporator 204 performs a defrosting operation, a defrosting heater 210 is operated. In a machine room under the display room 215, cooling apparatuses such as the compressor 201 and the condenser 202 that constitute the above freezing cycle, a fan 208 that cools down the condenser 202, etc., a control apparatus 209, etc. are installed. An outside air intake opening for taking in the outside air is formed on one side wall of the machine room, and a waste heat opening 207 is formed on the other side wall. An air filter 206 (also referred to as a filter) for filtering dust is removably mounted near the outside air intake opening. On the side of the suction opening 214 in the air duct 212, there are cases in which an anemometer for monitoring a ventilation status between the supply opening 213 and the suction opening 214 is installed. A temperature sensor (not illustrated) is arranged in the display room 215 or near the supply opening 213 in the air duct 212, and the control apparatus 209 controls a temperature control operation (ON/OFF control of the cooling operation).

The most common cause of malfunctions of the freezer showcase 20 is said to be clogging of the filter of the air-cooled condenser 202. When the filter 206 is clogged by trash or dust, a cooling performance is deteriorated. If this state is continuously neglected, the freezer showcase 20 could malfunction. Thus, it is necessary to clean the filter 206 when the freezer showcase 20 is used. For example, generally, the vendor or the like of the freezer showcase 20 recommends regular cleaning about once in one or two weeks. However, since the filter 206 is close to a store floor, clogging of the filter progresses differently depending on an environment of a customer store, the number of customers, etc. In addition, it is often the case that store employees or part-time workers fail to clean the filter.

Various techniques have been disclosed as a technique for notification of a filter cleaning time in relation to refrigerating/freezing apparatuses and other apparatuses.

PTL 3 discloses a technique for grasping a cleaning time of an air filter of a cooling mechanism in an optical drive system. According to PTL 3, time in which a drive main body is driven by a power supply is measured cumulatively. When a predetermined time is counted, the user is notified that an air filter cleaning time (or replacement time) has been reached.

PTL 4 discloses a technique for detecting clogging of a filter in an air-conditioning apparatus such as an air purifier or an air-cooling and -heating apparatus by using light. PTL 4 discusses accurately detecting change in transmittance and stably detecting filter clogging by appropriately disposing a light emitting part and a light receiving part with respect to the filter and air current.

Since the number of rotations of a fan or a motor also fluctuates due to an ambient temperature, a motor winding temperature, or a power supply voltage, if filter clogging is detected only based on the number of rotations, a large error could occur. To address this problem, PTL 5 discloses a technique for determining filter clogging by measuring a pressure difference between a location before a filter of a ventilator and blower apparatus and a location after the filter.

PTL 6 discloses a technique for detecting a cleaning time of an air filter of an air-conditioner. From relationship between an amount of air that passes through the air filter and the number of rotations of a fan (or a control value thereof), whether the air filter is in a normal or clogged state is determined. However, in accordance with the technique in PTL 6, an additional sensor needs to be installed in the apparatus. Thus, it is difficult to introduce this technique in refrigerating/freezing apparatuses that have already been used in customer stores.

PTL 7 discloses an overheat protection apparatus and a projector equipped therewith. By measuring an outside temperature and an outside atmospheric pressure at which a apparatus is used, grasping an environment in which the apparatus is used, and accurately determining a degree of clogging of an air filter, the overheat protection apparatus can control the number of rotations of a cooling fan, turn off a power supply, and output a sign recommending a user to clean or replace the air filter, depending on a use environment.

PTL 8 discloses a floor level cleaner equipped with a filter clogging detection function of measuring a current value of a blower in a certain operation and detecting filter clogging based on change of the current attribute to filter clogging. According to PTL 8, detection of filter clogging is enabled without using a device such as a pressure sensor, thereby achieving cost reduction. According to the technique in PTL 8, since only the fun uses a current, to apply this technique to a refrigerating/freezing apparatus, a sensor or the like that measures a current value of only the fan is needed. It is difficult to introduce this technique in refrigerating/freezing apparatuses that have already been used in customer stores.

PTL 9 discloses a technique for calculating a filter cleaning priority level based on a temperature inside a showcase and an operating status thereof. According to PTL 9, from diagnostic internal information and operation control information about the showcase, a load factor of the showcase is calculated. Next, from a degree of the load factor, dirtiness of a cooling apparatus is grasped. However, to access the internal diagnostic information, etc., cooperation or the like from a manufacturer of the refrigerating/freezing apparatus or the like is needed. In addition, an apparatus for the information collection is also needed.

In addition, PTL 10 discloses a configuration including an air filter that can perform ventilation between a storage part and space outside the storage part, a power consumption detection part that detects a power consumption of an apparatus to be cooled, a rotation number detection part that detects the number of rotations of a fan, and a mounting density calculation part that calculates a mounting density of parts of the apparatus to be cooled. When a power consumption is equal to or less than a predetermined threshold, if the number of rotations of the fan falls within a predetermined range, and if the difference between the temperature inside the storage part and the temperature outside the storage part exceeds a predetermined threshold that depends on the mounting density and the power consumption, it is determined that the air filter is in a clogged state. In the case of PTL 10, too, the rotation number detection part, the implementation density calculation part, etc. are needed, in addition to the power consumption detection part.

PTL 6: Japanese Unexamined Patent Application Publication No. Hei 8-257332

PTL 7: Japanese Unexamined Patent Application Publication No. 2008-262033

PTL 8: Japanese Unexamined Patent Application Publication No. 2006-288513

PTL 9: Japanese Unexamined Patent Application Publication No. 2016-223711

PTL 10: Japanese Unexamined Patent Application Publication No. 2011-249522

SUMMARY

It takes a different time (period) for a clogging state of a filter of a refrigerating/freezing apparatus such as a freezer showcase to reach a filter cleaning time, depending on an installation environment or the like. According to the related techniques, to install a system that gives a notification of a filter cleaning time, an existing refrigerating/freezing apparatus or a management system needs to be modified or altered. For example, to determine a filter cleaning time in consideration of an installation environment of a refrigerating/freezing apparatus, a sensor or the like for acquiring the installation environment (external environment) is separately needed.

It is extremely difficult to modify or alter a refrigerating/freezing apparatus, such as a freezer showcase, that has already been installed in a store of a supermarket, convenience store and so forth, developed in an area wide or a nation wide scale. That is, it is difficult to facilitate introduction of a system that gives a notification of a filter cleaning time to a customer stores or the like in which a refrigerating/freezing apparatus has already been installed.

The present invention has been made in view of the above problems, and it is an object of the present invention to provide an apparatus, a method, and a program medium, each facilitating determination of necessity of filter cleaning at a customer store or the like in which a refrigerating/freezing apparatus has already been installed, with no need to modify or alter the refrigerating/freezing apparatus, etc., and to perform installation or the like of a sensor for acquiring environmental information.

According to one mode of the present invention, there is provided a state estimation apparatus including: a current information acquisition part that acquires information about a current at a power supply part of a refrigerating/freezing apparatus; a current information storage part that holds current information in a normal state of the refrigerating/freezing apparatus; an evaluation part that derives a degree of change based on the acquired current information and the current information in the normal state of the refrigerating/freezing apparatus; a filter cleaning determination part that estimates a clogging state of a filter of the refrigerating/freezing apparatus based on the degree of change to determine whether cleaning of the filter is necessary; and an output part that provides, for a determination result indicating that the cleaning of the filter is necessary, an output to that effect.

According to one mode of the present invention, there is provided a state estimation method including:

acquiring information about a current at a power supply part of a refrigerating/freezing apparatus;

deriving a degree of change based on the acquired current information and current information in a normal state of the refrigerating/freezing apparatus; and estimating a clogging state of a filter of the refrigerating/freezing apparatus based on the degree of change to determine whether cleaning of the filter is necessary.

According to a mode of the present invention, there is provided a program causing a computer to execute:

processing for acquiring information about a current at a power supply part of a refrigerating/freezing apparatus;

processing for deriving a degree of change based on the acquired current information and current information in a normal state of the refrigerating/freezing apparatus; and processing for estimating a clogging state of a filter of the refrigerating/freezing apparatus based on the degree of change to determine whether cleaning of the filter is necessary. According to a mode of the present invention, there is provided a program storage medium in which the program is stored. For example, this program recording medium is provided as a non-transitory computer-readable recording medium such as a semiconductor storage such as a RAM (Random Access Memory), a ROM (Read-Only Memory), or an EEPROM (Electrically Erasable And Programmable ROM), a HDD (Hard Disk Drive), a CD (Compact Disc), or a DVD (Digital Versatile Disc).

The present invention can facilitate determination of necessity of filter cleaning at a customer store or the like in which a refrigerating/freezing apparatus showcase has already been installed, with no need to modify or alter the refrigerating/freezing apparatus, and to perform installation or the like of a sensor for acquiring environmental information. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

A mode of the present invention will be described. According to a mode of the present invention, the following is performed:

acquiring current information from a power supply part (e.g., a distribution board, a power tap (power strip), or the like) of a refrigerating/freezing apparatus, deriving a degree of change based on the acquired current information and current information in a normal state of the refrigerating/freezing apparatus, and estimating, based on the degree of change (e.g., based on a comparison between the degree of change and a threshold or the like), a clogging state of a filter of the refrigerating/freezing apparatus to determine whether cleaning of the filter is necessary.

According to the mode of the present invention, only current information needs to be measured to determine whether cleaning of a filter (an air filter of an air-cooled condenser) of a refrigerating/freezing apparatus is necessary. That is, estimation of a clogging state of the filter can be implemented, for example, on a management system that manages power energy of store facilities. Thus, there is no need to modify or alter the refrigerating/freezing apparatus installed in the customer store. In addition, there is no need to install a sensor (a pressure sensor, a temperature sensor) or the like, for acquiring environmental information about the refrigerating/freezing apparatus. As a result, it is possible to facilitate determination of necessity of filter cleaning at customer stores, etc. where refrigerating/freezing apparatuses have already been installed.

Exemplary Embodiment 1

Figure 1:
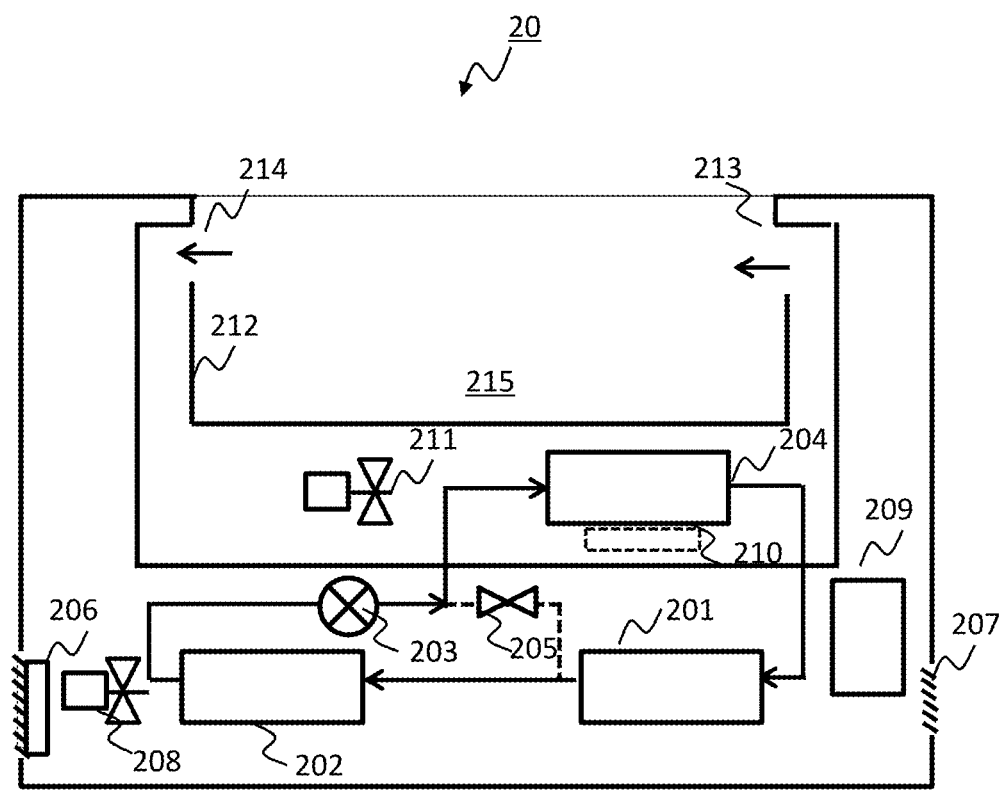
FIG. 1 is a diagram illustrating a configuration example of a freezer showcase.
Figure 2:
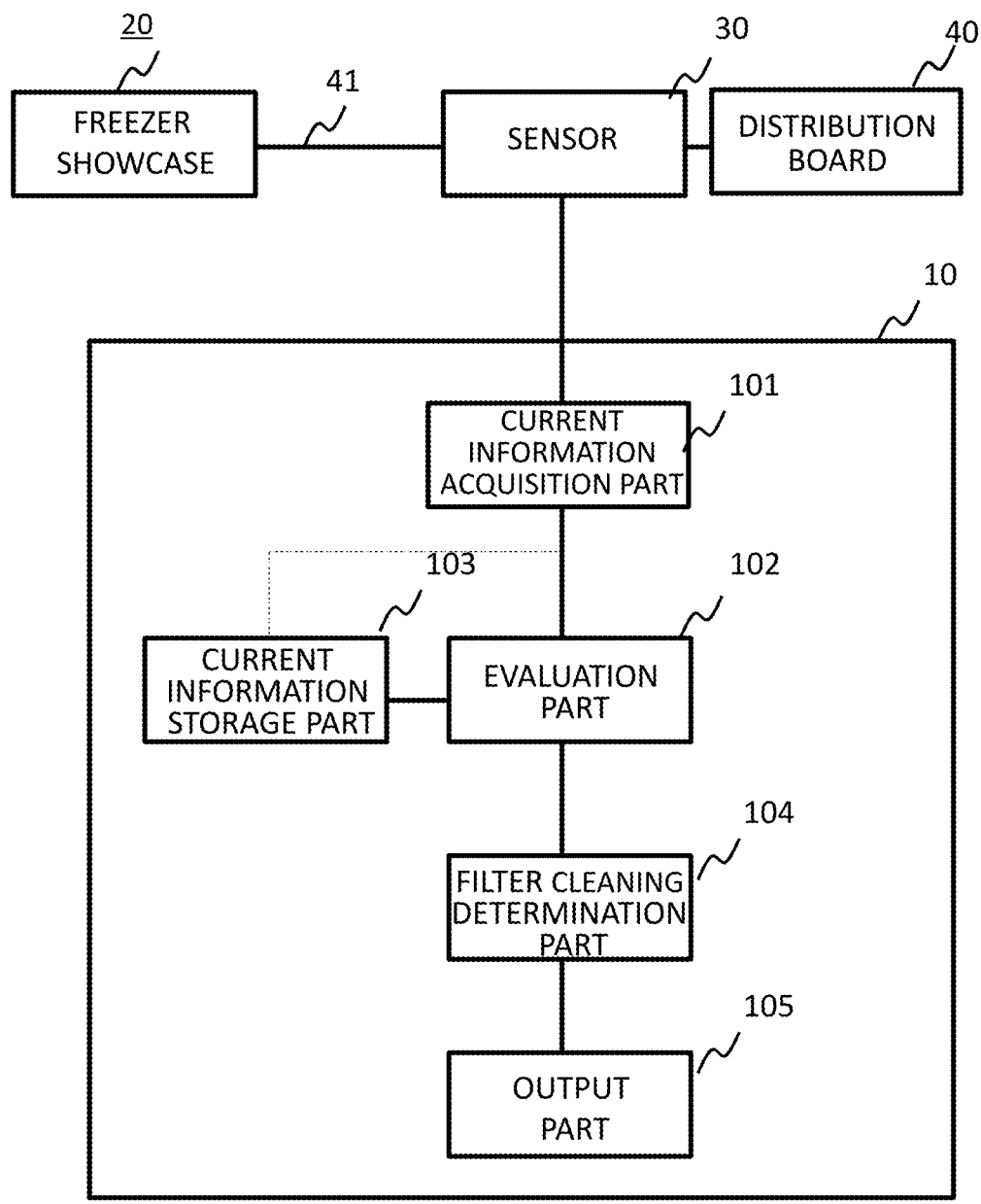
FIG. 2 is a diagram illustrating a configuration example according to an example embodiment of the present invention.

FIG. 2 illustrates an example embodiment 1 of the present invention. The following describes the example embodiment 1 by using the freezer showcase 20 described with reference to FIG. 1 as an example of a refrigerating/freezing apparatus (an apparatus other than a freezer showcase may also be used as an example of a refrigerating/freezing apparatus). The following describes the example embodiment also with reference to FIG. 1.

In FIG. 2, a sensor 30 acquires information about current (current consumption of the freezer showcase 20) flowing through a power supply part of the freezer showcase 20. A state estimation apparatus 10 receives time-series data of the current value acquired by the sensor 30.

The state estimation apparatus 10 includes a current information acquisition part 101, an evaluation part 102, a current information storage part 103, a filter cleaning determination part 104, and an output part 105.

The current information acquisition part 101 acquires current information (time-series data of the current-value) from the sensor 30 and temporarily stores the current information in its internal buffer memory (not illustrated) or the like.

The evaluation part 102 converts current information about the freezer showcase 20 that is stored in advance in the current information storage part 103 and that corresponds to a normal state of a filter, and the current information about the freezer showcase 20 currently acquired by the current information acquisition part 101 respectively into current waveforms and evaluates a degree of change. As the degree of change, the evaluation part 102 may perform quantitative evaluation based on numerical values. Alternatively, the evaluation part 102 may express the degree of change by classifying the degree of change into one of categories (ranks) such as a large change, an intermediate change, a small change, no change, etc.

Based on the degree of change outputted from the evaluation part 102, the filter cleaning determination part 104 estimates a clogging state of the filter 206 of the freezer showcase 20 to determine whether cleaning of the filter is necessary.

When the determination result by the filter cleaning determination part 104 indicates that the cleaning of the filter of the freezer showcase 20 is necessary, the output part 105 notifies (displays) to that effect. The output part 105 may notify, via communication means, a management terminal or a point-of-sale (POS) register terminal of the corresponding store or a portable terminal or the like of an employee or a part-time worker that the cleaning of filter of the freezer showcase 20 is necessary.

The current information storage part 103 may receive the current-value time-series data from the current information acquisition part 101 in advance (before the state estimation apparatus 10 determines whether to clean the filter), derive current information corresponding to a normal operation of the freezer showcase 20, and store the current information therein. Immediately after the filter 206 of the freezer showcase 20 is cleaned, the current-value time-series data may be received from the current information acquisition part 101, supplied to the current information storage part 103 of the state estimation apparatus 10, and stored as the current information corresponding to the normal operation of the freezer showcase 20 in the current information storage part 103. Alternatively, a user may perform setting input of the current information corresponding to the normal operation of the freezer showcase 20 in the current information storage part 103, from a control terminal or the like not illustrated.

According to the example embodiment of the present invention, it is only necessary to measure current information to determine whether to clean the filter 206. The example embodiment facilitates introduction to a customer store where the freezer showcase 20 has already been installed without touching the freezer showcase 20 (alteration or the like of the freezer showcase 20 is not necessary).

A distribution board 40 is given as an example of the power supply part of the freezer showcase 20. The freezer showcase 20 is connected to a branch wire (feeder wire) 41 of the distribution board 40. The sensor 3 acquires a current flowing through the branch wire 41 of the distribution board 40 and forwards the current information to the current information acquisition part 101 via a communication interface (not illustrated) in the sensor 30.

The sensor 30 may be a current transformer (CT) type current sensor that convers a measured current to a secondary current corresponding to a winding ratio, or a Hall element type current sensor that converts a magnetic field that occurs around the measured current into a voltage by using a Hall effect, for example. The current information acquisition part 101 may acquire, via the sensor 30a, a current at a power outlet of the freezer showcase 20 as the power supply part of the freezer showcase 20.

The current information acquisition part 101 may, at a time when determination of necessity of the filter cleaning is performed, transmit, to the sensor 30, a measurement command instructing the sensor 30 to measure a current value and transmit time-series data of the current value. In this case, based on the measurement command, the sensor 30 may measure a current flowing through the freezer showcase 20 and transmit the measurement result to the current information acquisition part 101.

For example, a state immediately after an operation is started, immediately after the filter is cleaned, immediately after the filter is replaced or the like may be given as the normal state of the filter 206. The timing at which determination of necessity of the filter cleaning is performed may have a width of a certain period of time. For example, when determination of necessity of the filter cleaning is performed and it is determined that the filter does not need to be cleaned, next determination of necessity of the filter cleaning may be performed after a predetermined time from the day on which the determination of necessity of the filter cleaning is performed. Alternatively, if it is estimated that clogging state of the filter is rather making some progress while cleaning is not needed, a period of time until the next determination of necessity of the filter cleaning is performed, may be shortened. Regarding the timing at which determination of necessity of the filter cleaning is performed, a timing at which a next determination of necessity of the filter cleaning is performed may be set in a timer (a system clock) or the like (not illustrated) held in the state estimation apparatus 10 and when the timer times out, the current information acquisition part 101 may transmit a measurement command to the sensor 30 and acquire a measurement result about the current of the freezer showcase 20 from the sensor 30 (current-value time-series data).

Figure 3:
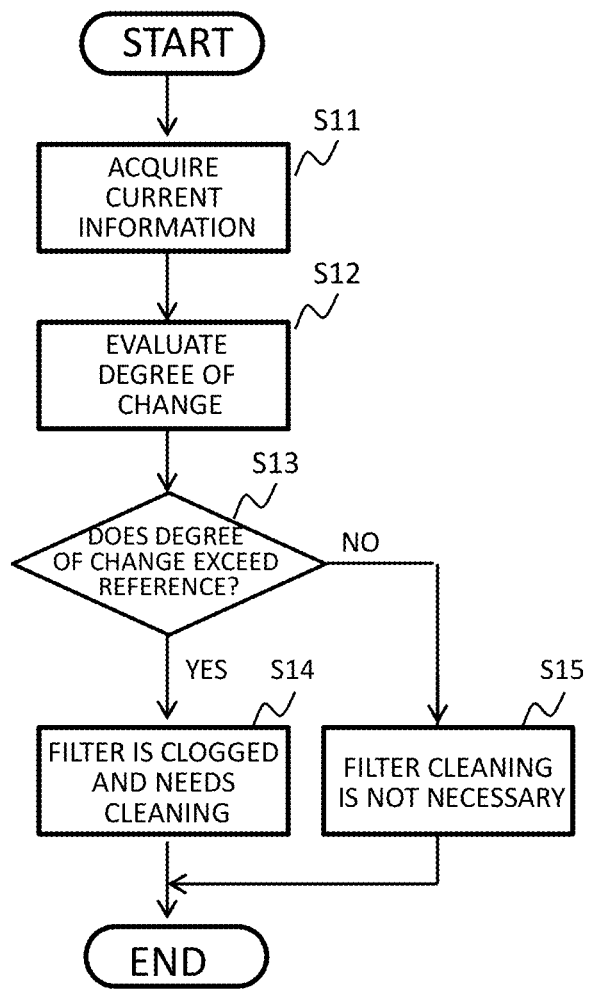
FIG. 3 is a flowchart illustrating the example embodiment of the present invention.

FIG. 3 is a flowchart illustrating an operation according to the example embodiment. The current information acquisition part 101 acquires current information about the freezer showcase 20 (current-value time-series data: a current waveform) (S11).

The evaluation part 102 evaluates a degree of change between the acquired current information and current information in the normal state of the filter 206 stored in advance in the current information storage part 103 (S12) and determines whether the degree of change exceeds a predetermined reference (criteria) (S13).

If the degree of change exceeds the reference (YES branch in S13), the filter cleaning determination part 104 estimates that the filter 206 is in a state where clogging has progressed and determines that filter cleaning is necessary (S14). If the degree of change matches the reference of the current information in the normal state or falls within the reference in the normal state (NO branch in S13), the filter cleaning determination part 104 determines that the filter cleaning is not necessary (S15).

In the freezer showcase 20, clogging of the filter 206 changes the operating efficiencies of the fan 208, the compressor 201, etc. The change of the operating efficiency causes a change in a frequency of a temperature control operation (an intermittent operation) by the compressor 201 (a constant-speed operation scheme). In addition, the clogging of the filter 206 is accompanied with increase in cooling load on the compressor 201, etc. and increase in a current (power) consumption. The same applies to the compressor 201 of an inverter control scheme.

The current information acquisition part 101 may extract current information corresponding to a temperature control operation (intermittent operation) performed after defrosting of the freezer showcase 20 from the current information about the freezer showcase 20 transmitted from the sensor 30 and may evaluate a degree of change of the extracted current information from the current information in the normal state of the filter 206 stored in the current information storage part 103 and determine whether the degree of change differs from a predetermined reference. The temperature control operation (intermittent operation) of the freezer showcase 20 will be described in the following example embodiment 2.

As an evaluation of the degree of change between the acquired current information and the current information in the normal state of the filter 206 stored in advance in the current information storage part 103, the evaluation part 102 may perform outlier detection on the acquired current information (time-series data).

Figure 4A:
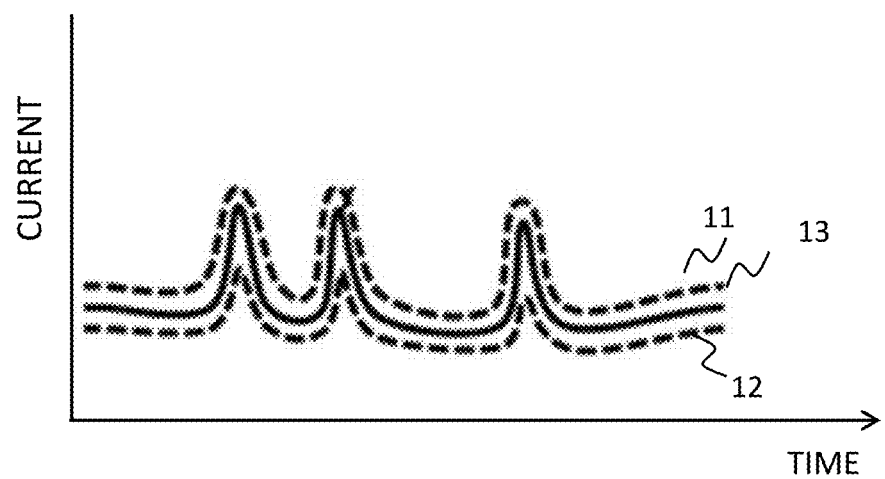
FIG. 4A is a diagram illustrating a current waveform in a normal state.

In FIG. 4A, waveforms 11 and 12 indicate upper and lower limits in a normal range set based on the current information (time-series data) in the normal state of the filter 206. The upper and lower limits are stored in advance in the current information storage part 103. The upper and lower limits of the current waveform may be calculated based on a current measured immediately after the operation of the freezer showcase 20 is started or when the freezer showcase 20 is operated immediately after the filter 206 is cleaned or replaced. In this case, the upper and lower limits may be set based on the maximum and minimum values of the time-series data of a plurality of sets of currents measured during the operation of the freezer showcase 20. Alternatively, the upper and lower limits may be set in view of statistical variation (a standard deviation $\sigma$, etc.) of the time-series data of a plurality of sets of currents. A current waveform (time-series data) 13 indicates the current information (current-value time-series data) currently acquired by the current information acquisition part 101.

In the example in FIG. 4A, the current waveform 13 acquired by the current information acquisition part 101 falls within a range between the waveforms 11 and 12, which are the upper and lower limits. That is, the degree of change falls within the reference.

Figure 4B:
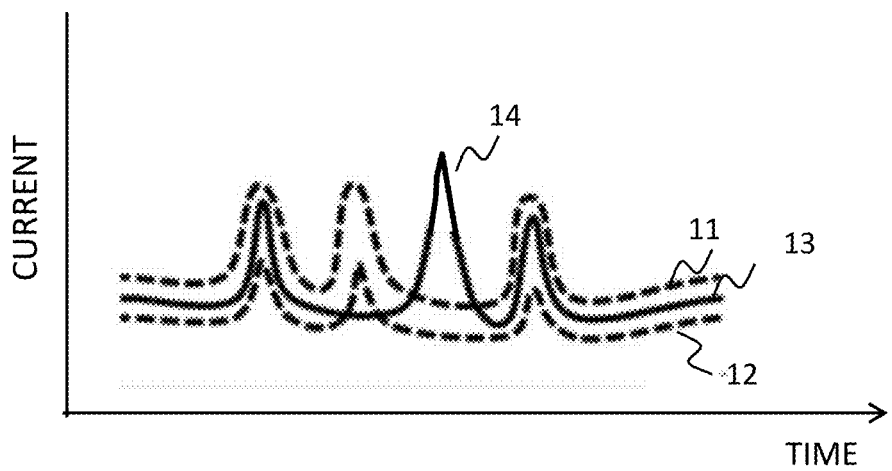
FIG. 4B is a diagram illustrating a current waveform including an outlier.

In FIG. 4B, a portion 14 in the current information 13 acquired by the current information acquisition part 101 is detected as an outlier.

Regarding an outlier in a simple example, assuming that the sample to be tested (the acquired current information) is denoted by x and the average is denoted by μ, a deviation x−μ is divided by a standard deviation σ, to obtain a test statistic.

$$\tau = \frac{x - \mu}{\sigma} \quad (1)$$

Alternatively, the corresponding absolute value may be obtained. If x does not fall within the range from μ±2σ to 3σ, this sample may be determined to be an outlier.

For example, it is assumed that the current information acquired by the current information acquisition part 101 is denoted by x[i] (i=1, N: N is the size (sampling number) of the time-series data) and that the upper and lower limits at an individual point (sample point) of the current in the normal state of the filter 206 stored in advance in the current information storage part 103 are denoted by $x_U[i]$ and $x_L[i]$, the following expression is calculated.

$$\tau[i] = \frac{|x[i] - (x_U[i] + x_L[i])/2|}{\sigma} \quad (2)$$

For example, if a predetermined i, a specific i, or a sum of a predetermined number of items relating to i exceeds, for example, 2 to 3, x[i] which is a value at the i (or the sum relating to i) may be determined to be an outlier. The standard deviation σ may be calculated and stored when the current information in the normal state is stored in the current information storage part 103. Regarding the standard deviation σ, too, at an individual sample point i, a specific sample point, or some sample points, a standard deviation σ[i] may be calculated and used as σ in expression (2).

The above outlier detection is an example of an elementary technique. The outlier detection may as a matter of course be performed by using k-means that is a typical technique of cluster analysis, support vector machine, or the like.

If the evaluation part 102 detects an outlier from the current information acquired by the current information acquisition part 101, the filter cleaning determination part 104 determines that the filter 206 is clogged and needs to be cleaned.

Alternatively, the evaluation part 102 calculates a correlation value r between the current information (current-value time-series data) x[i] (i=1, . . . , N) acquired by the current information acquisition part 101 and the current information (current-value time-series data) y[i] in the normal state of the filter 206 of the freezer showcase 20.

$$r = \frac{\frac{1}{N}\sum_{i=1}^{N}(x[i] - \bar{x})(y[i] - \bar{y})}{\sqrt{\frac{1}{N}\sum_{i=1}^{N}(x[i] - \bar{x})^2}\sqrt{\frac{1}{N}\sum_{i=1}^{N}(y[i] - \bar{y})^2}} \quad (3)$$

When, for example, the correlation value r is equal to or less than a predetermined threshold, the filter cleaning determination part 104 may determine that clogging of the filter 206 has progressed and cleaning of the filter needs to be performed.

Alternatively, the evaluation part 102 may calculate the difference between the acquired current information (current-value time-series data) x[i] (i=1, . . . , N) and the current information y[i] in the normal state of the filter 206 of the freezer showcase 20 as follows.

$$d[i] = x[i] - y[i]$$

The filter cleaning determination part 104 may determine necessity of cleaning of the filter 206 based on a magnitude relation between a statistical value (a maximum value, a minimum value, an average value or the like) of the difference d[i] and a predetermined threshold. For example, if the statistical value (the maximum value) of the difference d[i] exceeds the threshold, the filter cleaning determination part 104 may determine that clogging of the filter 206 has progressed and the filter 206 needs to be cleaned.

The evaluation part 102 may calculate an average value of the acquired current information (current-value time-series data) x[i] (i=1, . . . , N) in a predetermined period n in accordance with the following expression (where j is a predetermined positive integer).

$$\overline{x[j]} = \frac{\sum_{k=1}^{n} x[n(j-1)+k]}{n} \quad (4)$$

By performing the above outlier detection or correlation calculation on the average value $\overline{x[j]}$, the accuracy may be improved.

In the above example embodiment, the current information acquisition part 101 acquires the information about the current (current-value time-series data) flowing through the power supply part of the freezer showcase 20 from the sensor 30. However, the current information acquisition part 101 may acquire information about a power at the power supply part of the freezer showcase 20, calculate (estimate) current information from the power information, and supply the current information to the evaluation part 102. In the simplest calculation, in the case of the three-phase three-wire system, for example, P=√3×I×V×cos θ (cos θ is a power factor) may be used (I=P/(√3×V×cos θ)).

Exemplary Embodiment 2

In a second example embodiment of the present invention, the evaluation part 102 in FIG. 2 refers to the current information about the freezing cycle (the compressor 201 or the like) in the temperature control operation (the intermittent operation) of the freezer showcase 20. When a frequency of the intermittent operation falls below a value (reference value), which is a frequency of the intermittent operation at the normal operation, the evaluation part 102 may determine that the filter is clogged. From the current information (current-value time-series data) acquired from the current information acquisition part 101, the evaluation part 102 may estimate the power consumption of the freezer showcase 20. The estimation of the power consumption of an electrical appliance (facility) based on a current waveform may be performed by using an arbitrary technique that is, for example, used in "visualization of power" such as pattern learning of current waveforms of electrical appliances and learning of power consumption.

The frequency of the intermittent operation may be grasped by referencing to the power consumption calculated based on instantaneous-current-value time-series data of the freezer showcase 20, acquired by the current information acquisition part 101, by measuring a ratio of time during which the cooling operation is ON (when the compressor 201, etc. are on) in a constant time. If the ratio is a predetermined value or more, the filter cleaning determination part 104 determine that the filter is in a clogged state. Alternatively, 1/(cooling operation time+cooling stop time) in one cycle of the intermittent operation may be used as the frequency of the intermittent operation. In this case, when the cooling operation time increases, the frequency of the intermittent operation drops, and the frequency falls below a lower limit of the frequency corresponding to the normal operation in which the filter 206 is not clogged, the filter cleaning determination part 104 may estimate that the filter 206 is in a state in which the clogging has progressed and determine that the filter cleaning is necessary.

Figure 5:
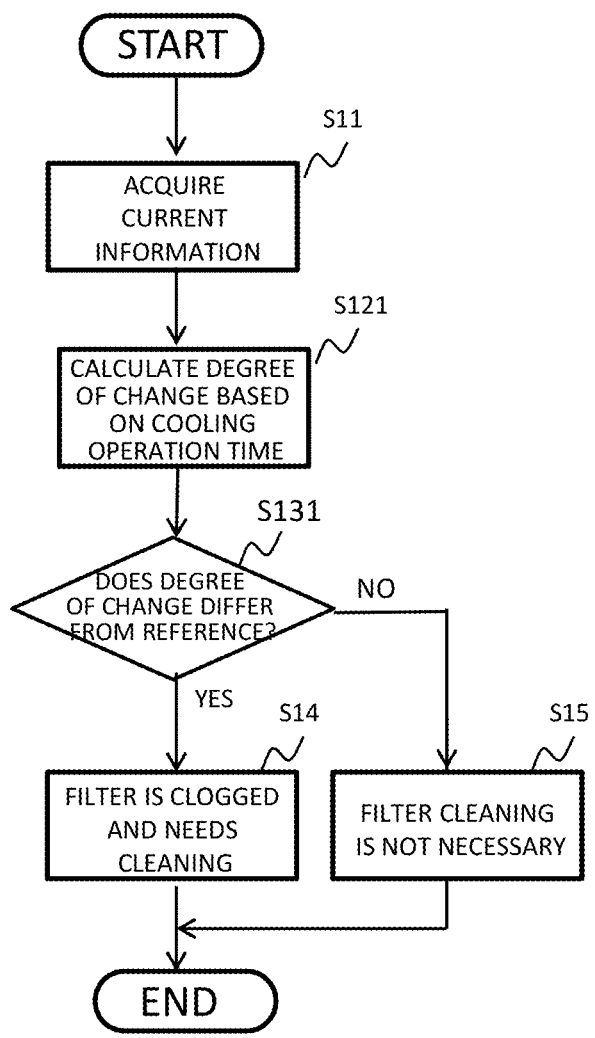
FIG. 5 is a flowchart illustrating an example according to an example embodiment of the present invention.

FIG. 5 is a flowchart illustrating an example according to the second example embodiment. Steps S11, S14, and S15 in FIG. 5 are the same as those in FIG. 3.

The current information acquisition part 101 acquires current information (power consumption of the freezer showcase 20 estimated from current information). The evaluation part 102 evaluates the cooling operation time after a defrosting operation based on the current information. The evaluation part 102 compares the evaluated cooling operation time and a cooling operation time after-defrosting-operation in a normal state of the filter 206 of the freezer showcase 20 stored in the current information storage part 103. Next, the evaluation part 102 outputs a result of the comparison as a degree of change (S121). The filter cleaning determination part 104 compares the degree of change with a reference value (a threshold) (S131). If the degree of change differs from the reference value, the filter cleaning determination part 104 determines that the cleaning of the filter is necessary (S14). If the degree of change matches the reference value or falls within a range of the reference value, the filter cleaning determination part 104 determines that the cleaning of the filter is not necessary (S15).

Based on the current-value time-series data (or power consumption information estimated therefrom) acquired from the current information acquisition part 101, the current information storage part 103 may in advance calculate the after-defrosting-operation cooling operation time in the normal state of the filter 206 of the freezer showcase 20 and may store the after-defrosting-operation cooling operation time therein. Alternatively, a manager or the like may, by using a terminal not illustrated, perform setting input of the after-defrosting-operation cooling operation time in the normal state of the filter 206 of the freezer showcase 20.

Figure 6:
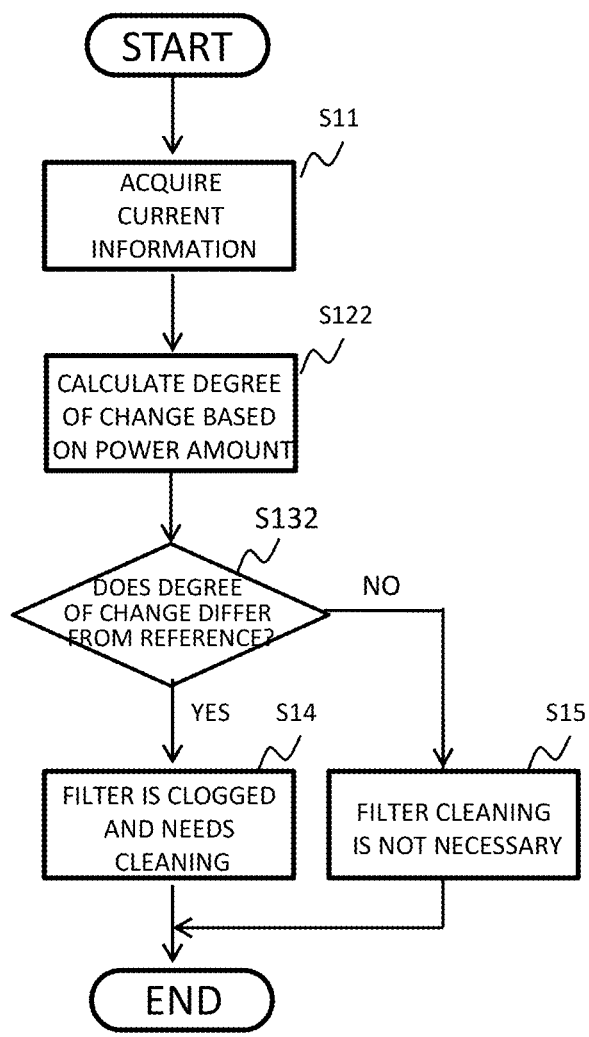
FIG. 6 is a flowchart illustrating another example according to the example embodiment of the present invention.

FIG. 6 is a flowchart illustrating another specific example according to the second example embodiment. The current information acquisition part 101 acquires current information (power consumption of the freezer showcase 20 estimated from current information). The evaluation part 102 evaluates, based on the current information, a power amount of the freezer showcase 20 in a predetermined period after a defrosting operation. The evaluation part 102 compares the power amount of the freezer showcase 20 in the predetermined period after-defrosting-operation in the normal state of the filter 206 stored in the current information storage part 103 and the power amount of the freezer showcase 20 in the predetermined period in the acquired power information, and outputs the comparison result as the degree of change (S122). The filter cleaning determination part 104 compares the degree of change with a reference value (a threshold) (S132). If the degree of change differs from the reference value, the filter cleaning determination part 104 determines that the cleaning of the filter is necessary (S14). If the degree of change matches the reference value or falls within a range of the reference value, the filter cleaning determination part 104 determines that the cleaning of the filter is not necessary (S15).

Based on the power consumption-value time series data acquired from the current information acquisition part 101, the current information storage part 103 may calculate in advance the power amount of the freezer showcase 20 in the predetermined period after-defrosting-operation in a normal state of the filter 206 and may store this power amount therein. Alternatively, a manager or the like may perform setting input of the power amount of the freezer showcase 20 in the predetermined period after-defrosting-operation in the normal state of the filter 206 by using a terminal not illustrated.

Figure 7A:
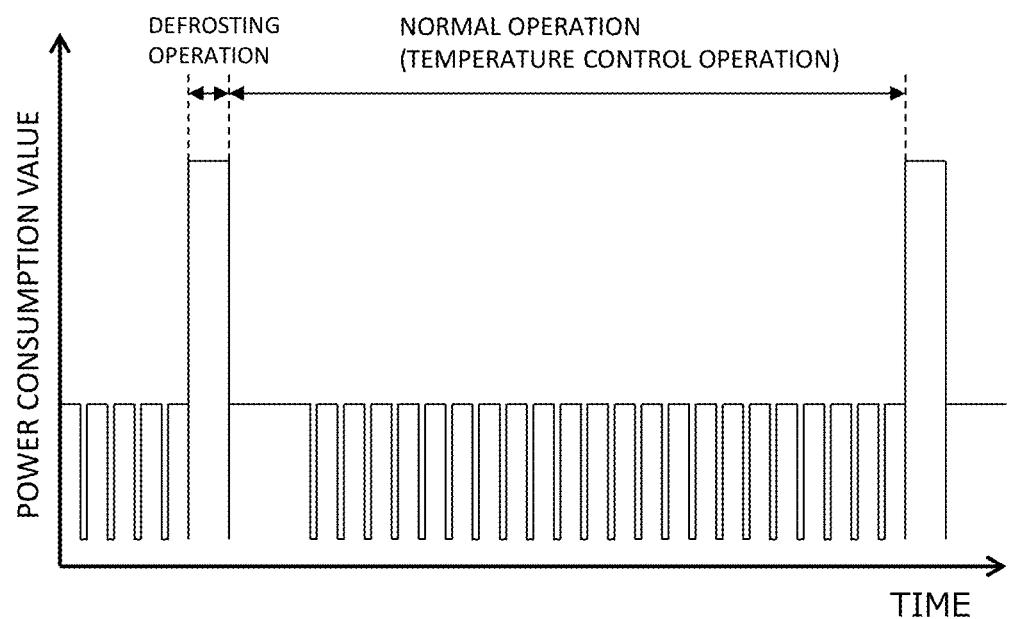
FIG. 7A is a diagram illustrating an example of a time-series pattern of a power consumption value in a normal operation performed, for example, immediately after filter cleaning.
Figure 7B:
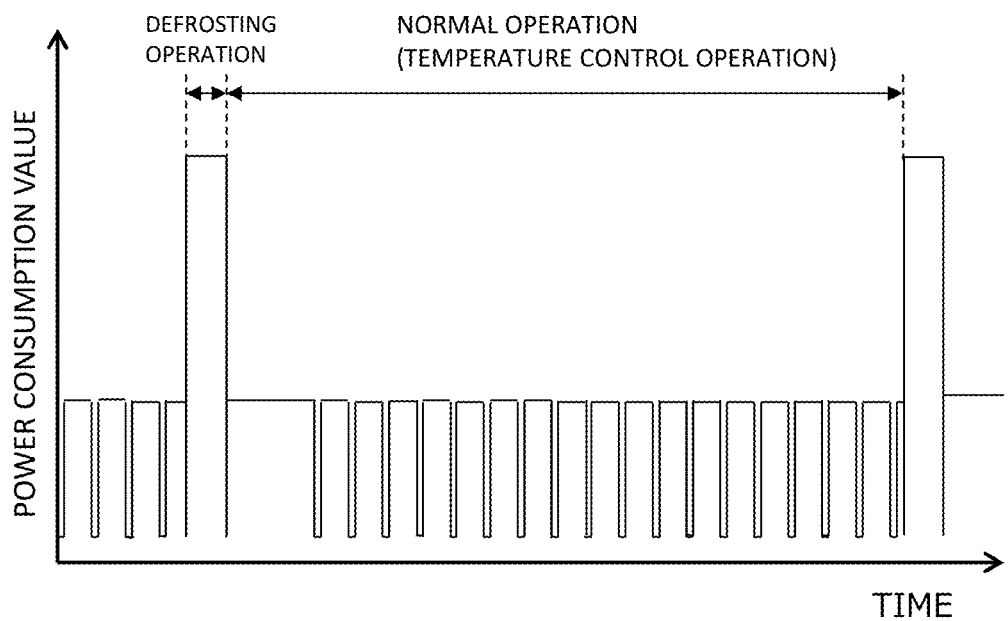
FIG. 7B is a diagram illustrating an example of a time-series pattern of a power consumption value in a state in which a filter is clogged.

FIG. 7A is a diagram illustrating an example of the power consumption in a temperature control operation in the normal state after the defrosting operation. FIG. 7B is a diagram illustrating an example of the power consumption in the temperature control operation after the defrosting operation in a filter clogging state. In FIGS. 7A and 7B, a horizontal axis represents time, and a vertical axis represents power consumption value. When the freezer showcase 20 performs a defrosting operation, in the case of a heater system, the heater 210 turns on. The defrosting operation of the freezer showcase 20 is performed by an internal timer of the control apparatus 209 every 8 or 12 hours or at a setting time, for example. In the normal operation (the temperature control operation), depending on the set temperature, the compressor is turned ON/OFF (within a temperature range about from 3 or 4° C.). The compressor is turned on for 15 to 20 minutes for example, and is turned off for 5 to 10 minutes, for example (the ON-time and the OFF-time are not limited to these examples).

Figure 8:
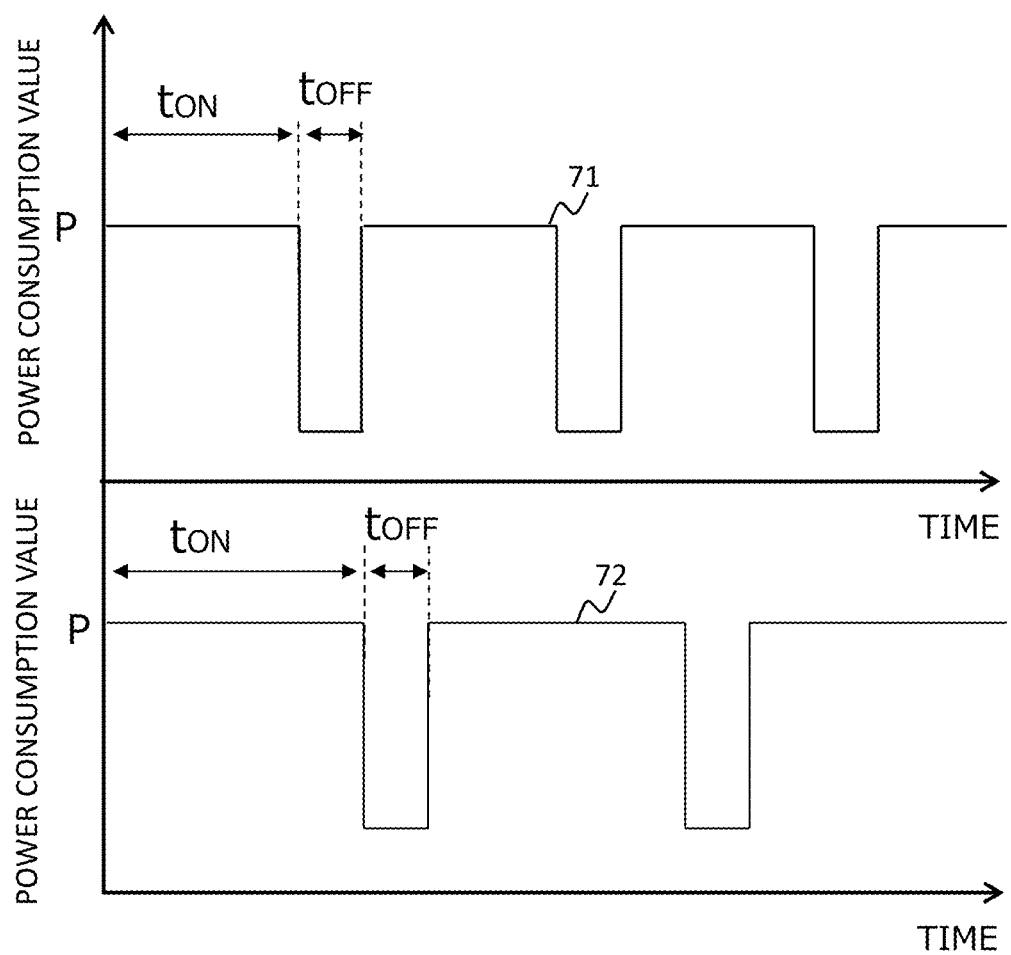
FIG. 8 is a diagram illustrating a relationship between an intermittent operation performed when a filter is in a normal state and an intermittent operation performed when a filter is clogged.

FIG. 8 is a diagram illustrating a power waveform 71 of the temperature control operation in FIG. 7A and a power waveform 72 of the temperature control operation in FIG. 7B. A horizontal axis represents time, and a vertical axis represents a power consumption value. Since only heat exchange is performed between an inside of the freezer showcase 20 and an outside air, OFF is performed (the compressor 201, etc. are turned OFF) for a constant time ($t_{OFF}$), irrespective of clogging of the filter 206. ON (the compressor 201, etc., are turned ON) corresponds to an amount of work in the freezing cycle. For example, when the filter 206 is clogged and an air volume drops, the cooling efficiency drops. In such cases, an ON time ($t_{ON}$) is elongated. In FIG. 8, only for the sake of simplicity, a constant value P is assumed to be the power value in the ON time ($t_{ON}$).

As the ON time ($t_{ON}$) becomes longer, the power amount=$P \times t_{ON}$ is increased. The evaluation part 102 may calculate a constant time of power amount after a defrosting operation time ($W = \Sigma_i P_i \times t_{i\ ON}$, where $P_i$ is the power value in a time period $t_{i\,ON}$, i=1, ... N, N is the number of cycles of the intermittent operation). The filter cleaning determination part 104 may compare this power amount with the predetermined period after-defrosting-operation power amount in a normal state of the freezer showcase 20, estimate the clogging state of the filter, and determine necessity of cleaning of the filter. The defrosting operation period may be acquired based on a magnitude of the current value (the estimated power value) based on the current information acquired by the current information acquisition part 101.

Figure 9:
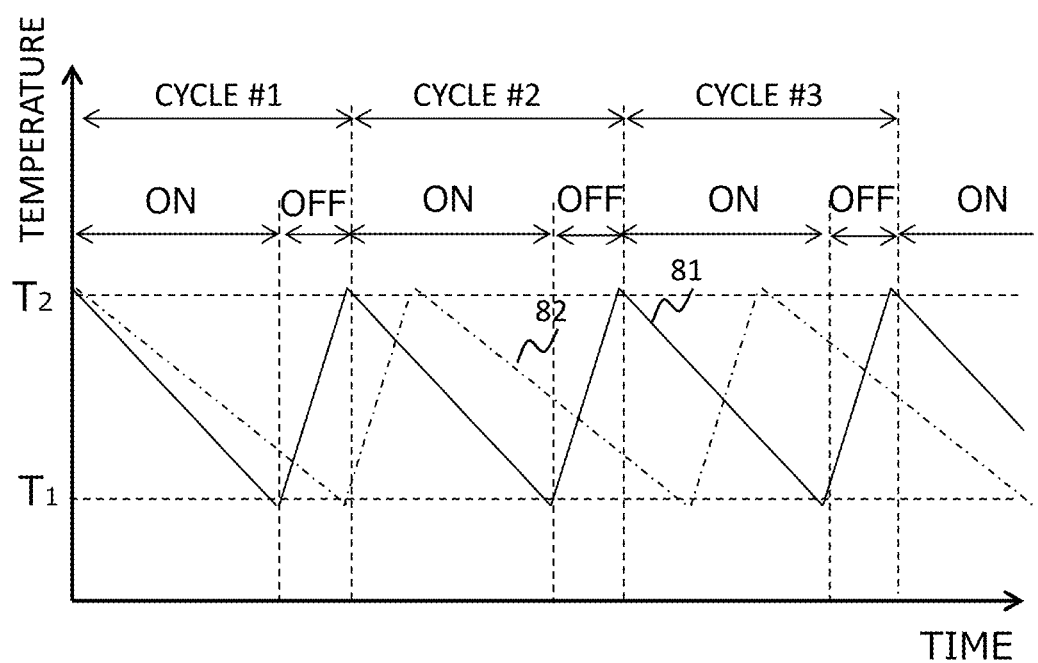
FIG. 9 is a diagram illustrating a relationship between a freezing cycle operation performed when a filter is in a normal state and a freezing cycle operation performed when a filter is clogged.

FIG. 9 illustrates intermittent operations corresponding to the power waveforms of the temperature control operations in FIG. 8. A solid line 81 is a diagram illustrating an intermittent operation performed when a filter is in a normal state, and an alternate long and short dash line 82 is a diagram illustrating an intermittent operation performed when a filter is clogged. The ON time (the compressor 201, etc., are turned On) continues until the temperature inside the freezer showcase 20 drops to $T_1$. When the temperature reaches $T_1$, the OFF time is started (the compressor 201, etc., are turned OFF), and the temperature inside the freezer showcase 20 begins to rise. When the temperature inside the freezer showcase 20 rises and reaches $T_2$, the ON time is started (the compressor 201, etc. are turned ON), and the temperature inside the freezer showcase 20 begins to drop. A combination of an ON time and an OFF time is one cycle of the intermittent operation.

When the filter 206 is clogged, since the ON period becomes longer than that in a normal state, a value (cycle) of an individual ON period plus an individual OFF period is elongated (the frequency is decreased).

Figure 10:
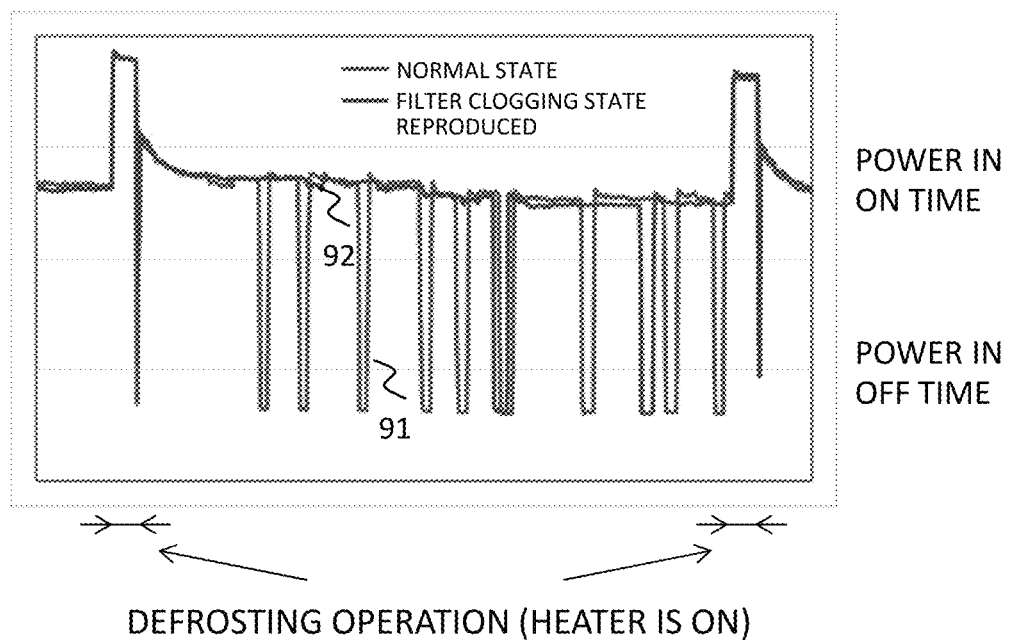
FIG. 10 is a diagram illustrating a measurement result about a power consumption value obtained when a filter is in a normal state and a power consumption value obtained when a filter is clogged.

FIG. 10 is a diagram illustrating an experimental result about fluctuation of power consumption in a period in which the freezer showcase 20 is operated (in two defrosting operations). In FIG. 10, 91 illustrates time-series data of a power value in a normal state (the filter 206 is clean), and 92 illustrates time-series data of a power value in a reproduced filter clogging state obtained by artificially clogging the filter. After a defrosting operation, in the normal state (the filter 206 is in a clean state) 91, nine cycles of intermittent operations were performed. In contrast, the time-series data of the power value 92 in the filter clogging state indicates that the OFF is performed twice (the compressor 201, etc. are turned OFF twice). Thus, two cycles of intermittent operations were performed.

The above example embodiment 2 has been described based on an example in which the evaluation part 102 estimates the power of the freezer showcase 20 based on the current information (current-value time-series data) that the current information acquisition part 101 acquires from the sensor 30. However, when the state estimation apparatus 10 can acquire power consumption at the power supply part of the freezer showcase 20, by setting the current information acquisition part 101 in FIG. 2 to serve as a power information acquisition part and by setting the current information storage part 103 in FIG. 2 to serve as a power information storage part that holds power information, the processing for estimating the power consumption of the freezer showcase 20 from a current waveform becomes unnecessary.

Figure 11:
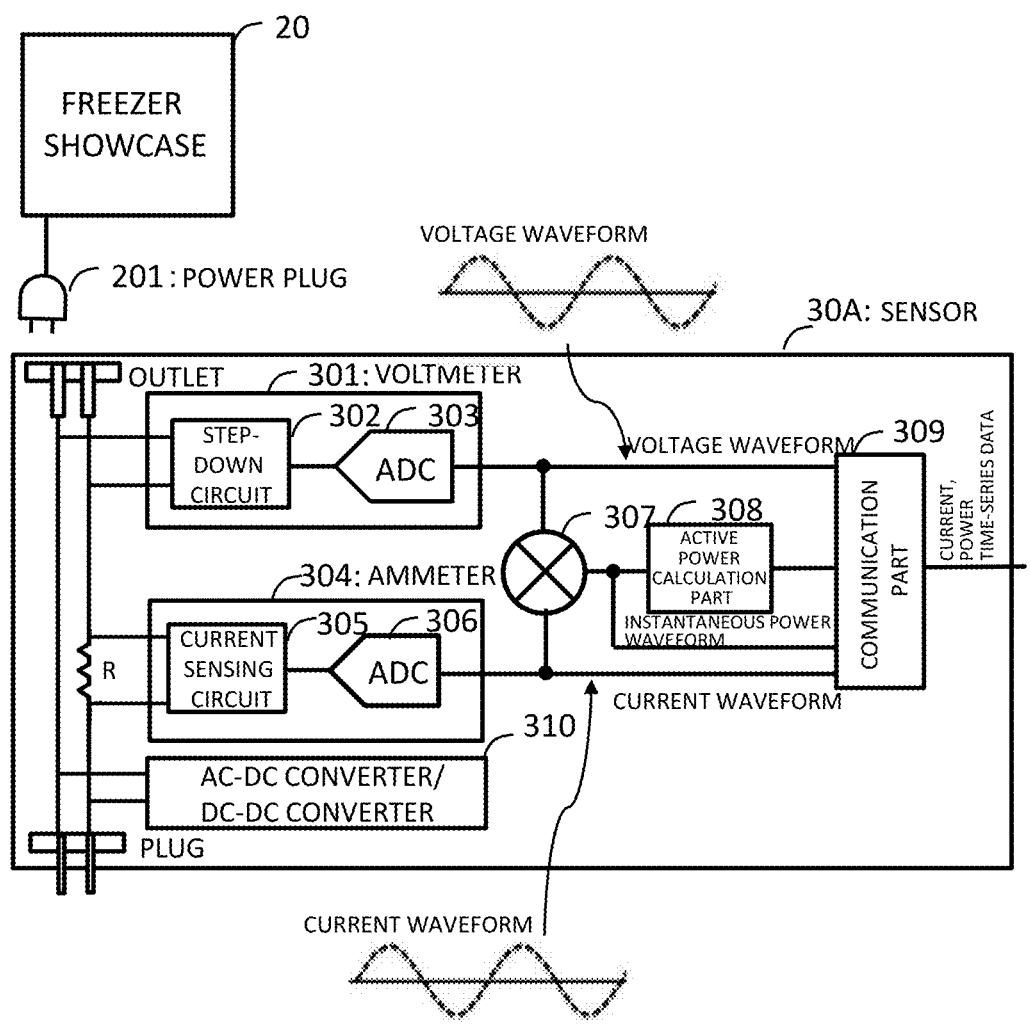
FIG. 11 is a diagram illustrating another example of a sensor.

FIG. 11 is a diagram illustrating an example of a sensor 30A that measures the power at the power supply part of the freezer showcase 20. In this case, the power supply part of the freezer showcase 20 is a power tap (power strip). As illustrated in FIG. 11, the sensor 30A includes a voltmeter 301 that measures a voltage between terminals of the power outlet and an ammeter 304 that measures a current. The voltmeter 301 includes a step-down circuit 302 that drops a voltage between the terminals and an analog-to-digital converter 303 that converts an analog output voltage of the step-down circuit 302 to a digital signal. The ammeter 304 includes a current sensing circuit 305 that senses a current flowing through the power supply line (load) and an analog-to-digital converter 306 that converts the analog output voltage of the current sensing circuit 305 to a digital signal.

The voltage waveform data from the analog-to-digital converter 303 of the voltmeter 301 and the current waveform data from the analog-to-digital converter 306 of the ammeter 304 are multiplied by, for example, a multiplier 307, and an instantaneous power waveform is obtained. The instantaneous power waveform is smoothed by an active power calculation part 308, and an active power value is calculated. The voltage waveform data, the power waveform data, the instantaneous power waveform, and the active power value are inputted to a communication part 309. The communication part 309 transmits current time-series data (waveform data) or power-value time-series data (waveform data) to the state estimation apparatus 10. When the communication part 309 receives a measurement command from the state estimation apparatus 10, the communication part 309 may transmit current-value time-series data (waveform data) and/or power-value time-series data (waveform data). In FIG. 11, an AC (Alternate Current)-DC (Direct Current) converter/DC-DC converter 310 generates a DC (direct current) power supply from an AC (alternate-current) power supply and supplies the DC power supply to the analog-to-digital converters 303 and 306, the multiplier 307, the active power calculation part 308, and the communication part 309. In FIG. 11, while a single-phase two-wire system AC is illustrated as an example, the measurement is also possible by using three single-phase wattmeters in the case of a three-phase three-wire system AC, for example. Alternatively, the power may be measured based on a two-wattmeter method.

Figure 12:
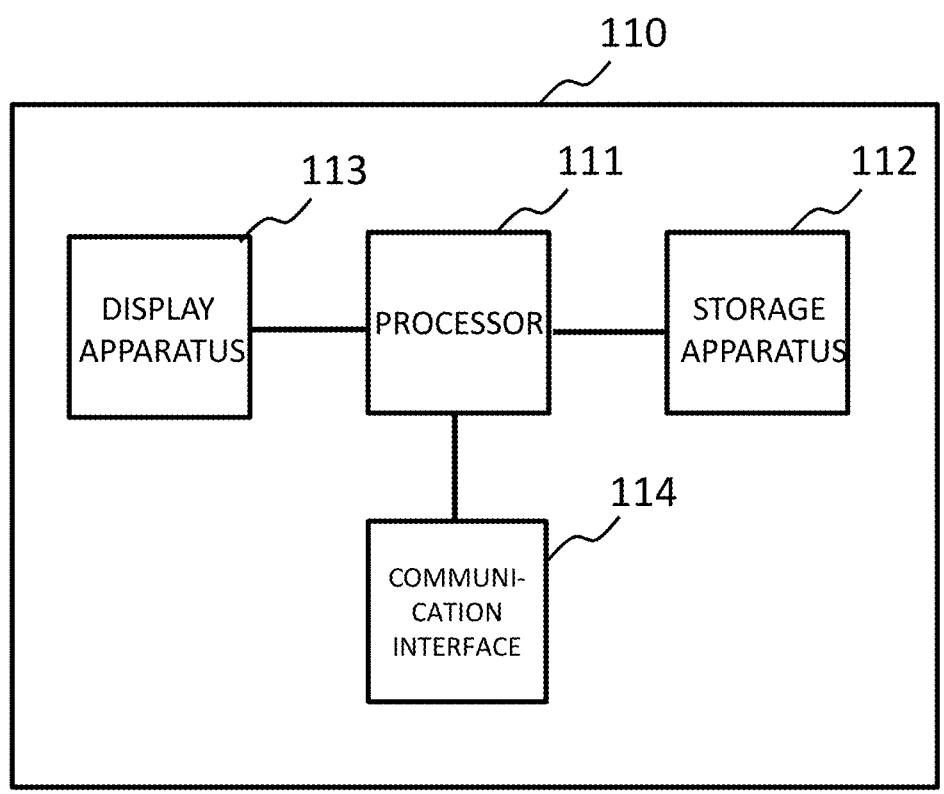
FIG. 12 is a diagram illustrating an example embodiment of the present invention.

The state estimation apparatus 10 in FIG. 2 may be implemented on a computer apparatus as illustrated in FIG. 12. As illustrated in FIG. 12, a computer apparatus 110 such as server computer includes a processor (a CPU (Central Processing Unit) or a data processing apparatus) 111, a storage apparatus 112 including at least one of a semiconductor memory (e.g., a RAM (Random Access Memory), a ROM (Read-Only Memory), an EEPROM (Electrically Erasable And Programmable ROM), etc.), a HDD (Hard Disk Drive), a CD (Compact Disc), a DVD (Digital Versatile Disc), etc., a display apparatus 113, and a communication interface 114. The communication interface 114 serves as a communication part that acquires power and/or current information acquired by the sensor 30 in FIG. 2 via a communication network. The state estimation apparatus 10 according to the above example embodiment 1 or 2 may be realized by storing a program that realizes the functions of the state estimation apparatus 10 in FIG. 2 in the storage apparatus 112 and causing the processor 111 to read and execute the program.

While an example of a flat-type open showcase has thus been described, the present invention is, as a matter of course, also applicable to an upright-type open showcase. In addition, application of the present invention is not limited to refrigerating and freezing open showcases. Needless to say, the present invention is also applicable to other refrigerating/freezing apparatuses.

The disclosure of each of the above PTLs 1 to 10 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. That is, the present invention of course includes various variations and modifications that could be made by those skilled in the art according to the overall disclosure including the claims and the technical concept.

What is claimed is:

1. A state estimation apparatus comprising:
a processor;
a memory storing program instructions executable by the processor; and
a current information storage that stores current information in a normal state of a refrigerating/freezing apparatus, wherein
the processor, when executing the program instructions stored in the memory,
acquires information about a current at a power supply part of the refrigerating/freezing apparatus;
derives a degree of change based on the acquired current information and the current information in the normal state of the refrigerating/freezing apparatus;
estimates a clogging state of a filter of the refrigerating/freezing apparatus based on the degree of change to determine whether cleaning of the filter is necessary; and
provides, for a determination result indicating that the cleaning of the filter is necessary, an output to that effect,
wherein, based on the acquired current information about a freezing cycle in an intermittent operation of the refrigerating/freezing apparatus after a defrosting-operation of the refrigerating/freezing apparatus, the processor calculates a frequency of the intermittent operation after the defrosting-operation,
compares the frequency and a frequency of the intermittent operation after a defrosting-operation in the normal state of the refrigerating/freezing apparatus, stored in the current information storage, and
outputs a result of the comparison as the degree of change.

2. The state estimation apparatus according to claim 1, wherein the processor calculates the frequency of the intermittent operation after the defrosting-operation of the refrigerating/freezing apparatus, by measuring a ratio of time during which a cooling operation is set on in a constant time, based on the acquired current information, and
if the ratio is a predetermined value or more, the processor determine that clogging of the filter has progressed and the cleaning of the filter is necessary.

3. The state estimation apparatus according to claim 1, wherein the processor calculates 1/(cooling operation time+ cooling stop time) in one cycle of the intermittent operation, as the frequency of the intermittent operation after the defrosting-operation of the refrigerating/freezing apparatus, based on the acquired current information, and
if the frequency falls below a predetermined lower limit corresponding to the normal operation in which the clogging of the filter has not progressed, the processor estimates that clogging of the filter has progressed to determine that the cleaning of the filter is necessary.

4. A computer-based state estimation method comprising:
acquiring information about a current at a power supply part of a refrigerating/freezing apparatus;
deriving a degree of change based on the acquired current information and current information in a normal state of the refrigerating/freezing apparatus; and
estimating a clogging state of a filter of the refrigerating/freezing apparatus based on the degree of change to determine whether cleaning of the filter of the refrigerating/freezing apparatus is necessary,
wherein the deriving a degree of change comprises:
based on the acquired current information about a freezing cycle in an intermittent operation of the refrigerating/freezing apparatus after a defrosting-operation of the refrigerating/freezing apparatus, calculating a frequency of the intermittent operation after the defrosting-operation;
comparing the frequency and a frequency of the intermittent operation after a defrosting-operation in the normal state of the refrigerating/freezing apparatus, stored in the current information storage; and
outputting a result of the comparison as the degree of change.

5. A non-transitory computer readable storage medium storing a program causing a computer to perform processing comprising:
acquiring current information about a refrigerating/freezing apparatus;
deriving a degree of change based on the acquired current information and current information in a normal state of the refrigerating/freezing apparatus; and
estimating a clogging state of a filter of the refrigerating/freezing apparatus based on the degree of change to determine whether cleaning of the filter is necessary,
wherein the deriving a degree of change comprises:
based on the acquired current information about a freezing cycle in an intermittent operation of the refrigerating/freezing apparatus after a defrosting-operation of the refrigerating/freezing apparatus, calculating a frequency of the intermittent operation after the defrosting-operation;
comparing the frequency and a frequency of the intermittent operation after a defrosting-operation in the normal state of the refrigerating/freezing apparatus, stored in the current information storage; and
outputting a result of the comparison as the degree of change.

6. A state estimation apparatus comprising:
a processor;
a memory storing program instructions executable by the processor; and
a current information storage that stores current information in a normal state of a refrigerating/freezing apparatus, wherein
the processor, when executing the program instructions stored in the memory,
acquires information about a current at a power supply part of the refrigerating/freezing apparatus;
derives a degree of change based on the acquired current information and the current information in the normal state of the refrigerating/freezing apparatus;
estimates a clogging state of a filter of the refrigerating/freezing apparatus based on the degree of change to determine whether cleaning of the filter is necessary; and
provides, for a determination result indicating that the cleaning of the filter is necessary, an output to that effect, wherein the processor evaluates a cooling operation time after a defrosting operation of the refrigerating/freezing apparatus based on the acquired current information, and compares the evaluated cooling operation time and a cooling operation time after-defrosting-operation in a normal state of the filter of the refrigerating/freezing apparatus, stored in the current information storage, and outputs a result of the comparison as the degree of change.

* * * * *